| INPUTS | | | OUTPUTS | |
|---|---|---|---|---|
| a | b | c | A | B |
| 0 | 0 | 0 (IDENTICAL INPUTS) | 1 | 0 |
| 1 | 1 | 1 (IDENTICAL INPUTS) | 0 | 1 |
| 1 | 0 | 1 | NO CHANGE FROM OUTPUT CONDITION CORRESPONDING TO MOST RECENT IDENTICAL INPUTS CONDITION | |
| 1 | 1 | 0 | | |
| 1 | 0 | 0 | | |
| 0 | 1 | 1 | | |
| 0 | 0 | 1 | | |
| 0 | 1 | 0 (NONIDENTICAL INPUTS) | | |

INVENTOR
W. G. HALL
BY Lucian C. Canepa
ATTORNEY

INVENTOR
W. G. HALL
BY Lucian C. Canepa
ATTORNEY

United States Patent Office 3,081,407
Patented Mar. 12, 1963

3,081,407

UNANIMITY MEMORY CIRCUIT UTILIZING TRANSISTOR RESISTOR LOGIC MEANS

William G. Hall, Morris Township, Morris County, N.J., assignor to Bell Telephone Laboratories, Incorporated, New York, N.Y., a corporation of New York
Filed Nov. 2, 1959, Ser. No. 850,428
4 Claims. (Cl. 307—88.5)

This invention relates to digital information processing circuits, and more particularly to circuits for performing logic operations, i.e., operations which involve the recognition of spatial distributions of voltages and currents.

As the complexity and sophistication of modern day digital processing systems have increased, the demand for reliable and simple logic circuits capable of performing a wide variety of logic operations has also increased. Typical of the diverse and less well-known operations which the circuits of a complicated digital system may be required to perform is that described on page 122 of the University of Illinois Digital Computer Laboratory Report No. 80, October 1957. The operation there described is one in which the output electrical condition of a circuit is responsive to the application thereto of identical input signals to produce an output signal representative of one or the other binary value, depending, respectively, on the binary value of the identical input signals and responsive to the application thereto of nonidentical input signals to maintain the output in the condition representative of the most recently applied set of identical input signals. Such an arrangement might aptly be termed a unanimity memory circuit.

An object of the present invention is an improved logic circuit.

More specifically, an object of this invention is a simple and reliable unanimity memory circuit.

Another object of the present invention is a unanimity memory circuit which may be easily modified to receive additional input signals.

These and other objects of the present invention are realized in a specific illustrative embodiment thereof which includes two transistors to the base electrode of the first one of which are respectively coupled, through $n$ identical parallel resistors, $n$ input signals. The base electrode of the first transistor is also connected to a bias circuit and, through $n-1$ identical parallel feedback resistors, each equal in ohmic value to an input resistor, to the collector electrode of the second transistor.

Each of the collector electrodes of the embodiment is connected to a circuit, including at least one clamping diode, which maintains the collector electrode at one of two voltage levels respectively representative of the binary values "1" and "0." An output signal may be derived from either one of the collector electrodes, depending, respectively, on whether an output of one value or its inverse is desired.

The operation of the illustrative embodiment depends on the fact that the $n-1$ feedback resistors couple to the base of the first transistor currents which tend to maintain the status quo of that transistor and, thereby, of the entire circuit.

The bias circuit connected to the base of the first transistor includes a source of voltage and a bias resistor and is adjusted such that the regenerative feedback current can only be overcome by changing all of the input signals to the representation of the binary value opposite to the value that established the noted feedback current. If all of the input signals are changed to the opposite binary representation, the $n$ input resistors contribute to the base of the first transistor one more bit of "change" current than the "status quo" current bits supplied by the $n-1$ feedback resistors. As a result thereof, the input current overbalances the feedback current and assumes control of the condition of the embodiment, thereby to produce a new output condition. The new output condition causes a different value of current to be fed back to the first transistor, which different value tends to maintain the circuit in the new output condition. A change of less than all of the input signals will then not suffice to overcome the new feedback influence, a different identical or unanimous input condition being required to do that.

Thus, circuits illustratively embodying the principles of this invention include a signal translating device having an input electrode or summing point to which $n$ input signals each of weight one are combined with a regenerative feedback signal of weight $n-1$ to selectively control the condition of an output circuit.

It is a feature of the present invention that a unanimity memory circuit include first and second transistors or signal translating devices each including input and output electrodes, circuitry connected to the input electrode of the second transistor and responsive to the energization and deenergization of the first transistor for respectively deenergizing and energizing the second transistor, an output circuit connected to the output electrode of one or both of the transistors, a feedback circuit including $n-1$ parallel resistors interconnecting the output electrode of the second transistor and the input electrode of the first transistor, an input circuit including a bias circuit and $n$ parallel resistors connected to the input electrode of the first transistor, and circuitry including the $n-1$ parallel resistors responsive to the respective application of $n$ identical signals to the $n$ resistors for coupling to the output circuit a signal representative of one or the other binary value depending respectively on the binary value of the $n$ identical input signals and responsive to the application of nonidentical signals to the input circuit for maintaining the output circuit in the condition representative of the most recently applied set of identical input signals.

It is another feature of this invention that a unanimity memory circuit include a signal translator to the input terminal of which are connected $n$ input elements, $n-1$ feedback elements and a bias circuit; the bias circuit being adjusted such that the currents through the feedback elements maintain the translator in a given condition of conduction if less than all of the signals respectively coupled to the input elements change to representations of the binary value opposite to the value which produced the given condition.

It is still another feature of this invention that a unanimity memory circuit comprise a transistor having an electrode to which are connected $n$ input resistors and $n-1$ feedback resistors, each of the $n$ input and $n-1$ feedback resistors being of the same ohmic value.

It is also a feature of the present invention that a signal translator have an input and an output terminal, circuitry connected to the input terminal for coupling thereto $n$ input signals each of weight one, and a regenerative feedback circuit interconnecting the output and input terminals for coupling to the latter terminal a feedback signal of weight $n-1$.

A complete understanding of the present invention and of the above and other objects and features thereof may be gained from a consideration of the following detailed description of illustrative embodiments thereof presented hereinbelow with reference to the accompanying drawing, in which.

Figures 1A, 1B:
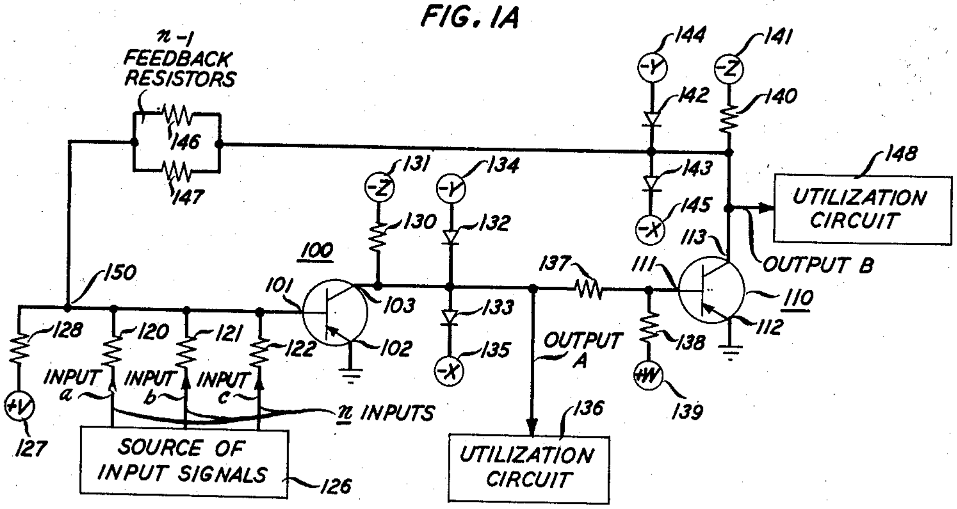
FIG. 1A is a circuit diagram of a specific illustrative embodiment of the principles of the present invention.
FIG. 1B is a table specifying the functional relationships among the input and output signals of illustrative embodiments of this invention.

Referring to FIG. 1A, there is shown a specific unanimity memory circuit which includes a first p-n-p transistor or signal translator 100 having base, emitter and collector electrodes 101, 102 and 103, respectively, and a second p-n-p transistor or signal translator 110 having base, emitter and collector electrodes 111, 112 and 113, respectively. Connected to the base or input electrode 101 of the transistor 100 is an input summing network including $n$ resistors. Illustratively, the specific embodiment considered herein includes only three input resistors 120, 121 and 122 to which are respectively coupled distinct binary signals $a$, $b$ and $c$ from a source 126 of input signals. Also connected to the base 101 of the first transistor 100 is a bias circuit including a positive bias source 127 of V volts and a bias resistor 128.

The collector or output electrode 103 of the transistor 100 of the circuit of FIG. 1A is connected through a resistor 130 to a negative source 131 of Z volts. Also, the collector electrode 103 is connected to the cathode and anode, respectively, of diode elements 132 and 133, the respective anode and cathode of the elements 132 and 133 being connected to negative sources 134 and 135 of Y and X volts, respectively. Available at the collector electrode 103 is an output binary signal A, which is shown in FIG. 1A as being coupled to a utilization circuit 136.

Additionally, the collector electrode 103 of the transistor 100 is connected through a resistor 137 to the base or input electrode 111 of the transistor 110, which base electrode 111 is connected through a resistor 138 to a positive source 139 of W volts.

The collector or output electrode 113 of the transistor 110 is connected through a resistor 140 to a negative source 141 of Z volts and to the cathode and anode, respectively, of diode elements 142 and 143, the respective anode and cathode of the elements 142 and 143 being connected to negative sources 144 and 145 of Y and X volts, respectively. Available at the collector electrode 113 is an output binary signal B, which is shown in FIG. 1A as being coupled to a utilization circuit 148.

Interconnecting the collector electrode 113 of the second transistor 110 and a node point 150, which is directly connected to the base electrode 101 of the first transistor 100, is a feedback network including $n-1$ parallel resistors. In the specific embodiment considered herein $n$ equals 3; thus, $n-1$ equals 2. The two feedback resistors depicted in FIG. 1A are designated 146 and 147.

From an overall standpoint the circuit depicted in FIG. 1A may be regarded as comprising two inverting amplifiers 100 and 110, the first of which, namely 100, performs a difference function. That is, the amplifier 100 provides at its output terminal 103 and, after inversion, at the output terminal 113 of the amplifier 110 signals which represent the difference between the sum of the signals coupled to the input terminal 101 and the fixed voltage of the other input terminal 102.

The operation of the specific unanimity memory circuit of FIG. 1A will now be described with the aid of the table of FIG. 1B. Assume, to begin with, that when the circuit of FIG. 1A is first energized the source 126 of input signals couples a negative voltage of magnitude X to each of the input resistors 120, 121 and 122. Illustratively, the level X may be taken to represent the binary signal "0." Assume further, for the moment, that the voltage of the node point 150 is positive with respect to ground, as a result of the currents contributed thereto by the $n$ parallel input paths, the bias source 127 and the $n-1$ parallel feedback paths. (Note that the emitter electrode 102 of the transistor 100 is grounded.) This voltage condition causes the transistor 100 to be cut off or deenergized and the collector-to-emitter impedance thereof to assume a relatively high value. Assuming that the source 131 is more negative than either of the sources 134 and 135, and that the source 134 is more negative than the source 135, it is seen that the collector electrode 103 of the nonconducting transistor 100 is clamped by the diode element 132 at a level of minus Y volts, which level will be assumed herein to represent the binary value "1." Thus, in response to identical or unanimous "0" signal inputs, there is coupled to the utilization circuit 136 an output signal A which is representative of the binary value "1." This condition is indicated in the first four columns of the first row of the table of FIG. 1B.

The minus Y volts appearing at the collector electrode 103 of the first transistor 100 are applied to a network which includes the positive source 139 of W volts and the resistors 137 and 138, the resistors 137 and 138 being so proportioned that the voltage appearing at the base 111 of the second p-n-p transistor 110 is negative with respect to ground. (Note that the emitter electrode 112 of the transistor 110 is grounded.) This voltage condition causes the transistor 110 to be energized, its collector-to-emitter impedance to assume a relatively low value and its collector electrode 113 to be clamped by the diode element 143 at a level of minus X volts, which level or "0" signal is coupled to the utilization circuit 148, as indicated by the entry in the fifth column of the first row of the table of FIG. 1B.

Thus, each of the feedback resistors 146 and 147 of the illustrative circuit of FIG. 1A has applied to the right-hand end thereof a voltage of minus X volts which, it is noted, is the same value of voltage that was assumed to have been initially applied to each of the input resistors 120, 121 and 122. Hence, the current contributed to the node point 150 by the feedback network tends to reinforce the action of the currents contributed thereto by the input network. Advantageously, every one of the input and feedback resistors may be of the same ohmic value, in which case each of the input and feedback resistors would contribute to the node point 150 the same value of current.

The reinforcement of the input influence by the positive feedback effect suggests that the circuit conditions assumed above are capable of establishing in the herein-considered unanimity memory circuit a state of stable equilibrium. This is indeed the case. It now remains to determine the value of the bias resistor 128 which will insure that the node point 150 will be positive with respect to the grounded emitter electrode 102 for the assumed condition wherein three "0" signals are respectively coupled to the input resistors 120, 121 and 122; which will insure that the node point 150 will remain positive for the condition wherein less than all of the input signals change to "1" indications; and which will insure that the node point 150 will be negative for the condition wherein three "1" signals are respectively coupled to the input resistors. The new equilibrium condition which results from the node point 150 going negative with respect to ground is represented by the second row of the table of FIG. 1B. The establishment of the new equilibrium condition will be developed in detail below, following the determination of the necessary value of the bias resistor 128.

By means of conventional techniques of network analysis it is possible to substitute for each of the input, feedback and bias resistors, and its associated applied voltage, an equivalent circuit which includes a constant current generator in parallel with a conductance. By such techniques, and realizing that the maintenance of the node point 150 at a positive potential for the case wherein two of the three inputs have changed from minus X to minus Y volts will clearly insure its positive nature for the cases wherein none or only one of the inputs has so changed, it can be determined, for the case of one input at a level of minus X volts and each of the other two at a level of minus Y volts, that the voltage at the node is given by the expression $$\frac{\frac{V}{r}-\frac{(3X+2Y)}{R}}{\frac{5}{R}+\frac{1}{r}} \qquad (1)$$

in which X and Y are the absolute values in volts of the levels which have been illustratively assumed herein to represent the binary values "0" and "1," V is the absolute value in volts of the bias source 127, $r$ is the value in ohms of the bias resistor 128, and R is the ohmic value of one of the equivalued resistors 120, 121, 122, 146 and 147.

If the parameters of the circuit of FIG. 1A are chosen such that the Expression 1 has a value greater than zero, the voltage of the node point 150, and, thus, of the base electrode 101 with respect to the grounded emitter electrode 102, will remain positive even if two of the three input signals $a$, $b$ and $c$ change from "0" to "1" signal representations.

Let us now provide an expression for the voltage at the node point 150 for the case wherein three "1" signals are respectively coupled to the input resistors 120, 121 and 122. This expression may be shown to be $$\frac{\frac{V}{r}-\frac{(2X+3Y)}{R}}{\frac{5}{R}+\frac{1}{r}} \qquad (2)$$

and should for the assumed input conditions have a value less than zero.

Clearly, a value for $$\frac{V}{r}$$

which is greater than $$\frac{3X+2Y}{R}$$

but less than $$\frac{2X+3Y}{R}$$

will make the Expressions 1 and 2, and, thus the voltages at the node point 150, positive and negative, respectively, for the two assumed input circuit conditions.

Now it remains to demonstrate that a negaive potential at the base electrode 101 of the first transistor 100, which negative potential, as indicated above, results only from identical or unanimous "1" input signals, is a stable circuit condition which will cause the output signals A and B to be respectively different from the values these outputs assumed in response to identical "0" signal inputs.

The application of a negative voltage with respect to ground to the base electrode 101 of the transistor 100 causes that transistor to conduct, its collector-to-emitter impedance to be relatively low and its collector electrode 103 to be clamped by the diode element 133 at a potential of minus X volts. Thus, in the assumed condition of identical "1" signal inputs, output A is a "0" signal, as indicated in the first four columns of the second row of FIG. 1B.

The application of minus X volts to the divider network 137, 138 and 139 causes the base electrode 111 of the transistor 110 to be positive with respect to the grounded emitter electrode 112. The transistor 110 is thereby cut off, its collector-to-emitter impedance assumes a relatively high value and its collector electrode 113 is clamped by the diode 142 at a potential of minus Y volts, which is representative of a "1" signal and is applied to the utilization circuit 148. (The fifth column of the second row of the table of FIG. 1B indicates this condition.) The potential of minus Y volts is also applied to the right-hand end of each of the feedback resistors 146 and 147 and, it is noted, is the same voltage value which was assumed to have been applied to each of the input resistors 120, 121 and 122. Thus, it has again been demonstrated that the feedback influence reinforces the input effect, thereby establishing in the circuit a condition of stable equilibrium.

Further, it can easily be shown, by employing expressions of the same general form as those presented above, that the output signals A and B will not change from the representations "0" and "1," respectively, as less than all of the input signals $a$, $b$ and $c$ change from "1" to "0" representations. The ability of the illustrative unanimity memory circuit of FIG. 1A to respond to the application of nonidentical input signals by maintaining the outputs in the conditions representative of the most recently applied set of identical input signals is indicated in the bottom six rows of the table of FIG. 1B.

It is noted that the diode clamping elements 133 and 143, and their respective sources 135 and 145, may be omitted from the circuit of FIG. 1A, in which case the collector electrodes 103 and 113 would be at approximately ground potential, rather than at a level of minus X volts, whenever the transistors 100 and 110 were respectively energized. In such a case, a near-ground potential would be representative of a "0" signal.

Figure 1C:
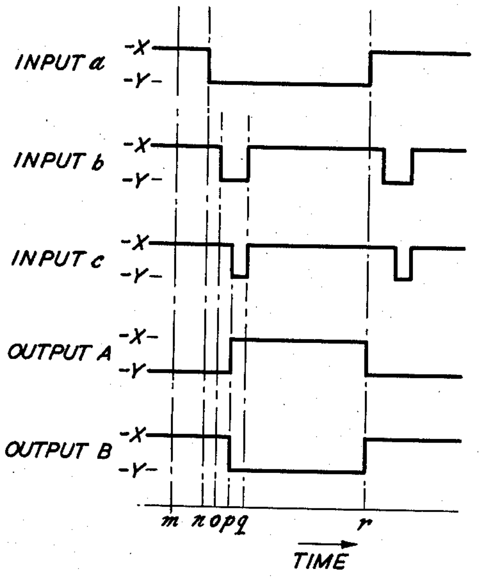
FIG. 1C is a timing diagram depicting the manner of operation of illustrative embodiments of this invention.

The timing diagram of FIG. 1C illustrates the operation of the specific circuit of FIG. 1A in a particularly graphic manner. Thus, for example, at a first instant of time, designated $m$ in FIG. 1C, identical or unanimous input signals each of a level of minus X volts produce an output signal A of minus Y volts and an output signal B of minus X volts. At instant $n$ input $a$ changes to minus Y volts, inputs $b$ and $c$ remain at minus X volts and the outputs A and B remain unchanged. At instant $o$ only input $c$ remains at minus X volts, but again the outputs remain unchanged. At instant $p$, however, each of the inputs $a$, $b$ and $c$ is at minus Y volts and the outputs A and B switch at that time to new voltage levels, viz., the levels minus X and minus Y volts, respectively. At instant $q$ both of the inputs $b$ and $c$ change back to minus X volts, but the outputs A and B remain at their new levels. Finally, at instant $r$ an identical inputs condition is again established at a level of minus X volts and outputs A and B then transfer back to their original conditions, viz., to the levels minus Y and minus X, respectively.

Figure 2:
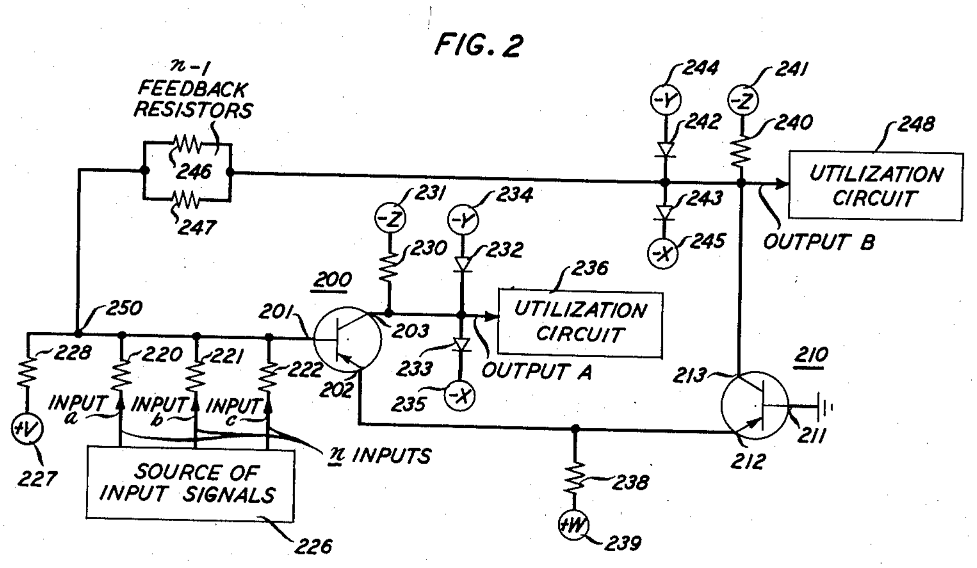
FIG. 2 is a diagram of another specific circuit illustratively embodying the principles of the present invention.

FIG. 2 which depicts another specific illustrative embodiment of the principles of the present invention is a diagram of a circuit whose configuration is closely patterned after that of the embodiment shown in FIG. 1A. Specifically, the unanimity memory circuit of FIG. 2 includes a first p-n-p transistor 200 having base, emitter and collector electrodes 201, 202 and 203, respectively, and a second p-n-p transistor 210 having base, emitter and collector electrodes 211, 212 and 213, respectively. Connected to the base or input electrode 201 of the transistor 200 is an input summing network including $n$ resistors. The specific embodiment shown in FIG. 2 illustratively includes only three input resistors 220, 221 and 222 to which are respectively coupled distinct binary signals $a$, $b$ and $c$ from a source 226 of input signals. Also connected to the base electrode 201 is a bias circuit including a positive bias source 227 of V volts and a bias resistor 228.

The collector or ouput electrode 203 of the transistor 200 is connected through a resistor 230 to a negative source 231 of Z volts. Also, the collector electrode 203 is connected to the cathode and anode, respectively, of diode elements 232 and 233, the respective anode and cathode of the elements 232 and 233 being connected to negative sources 234 and 235 of Y and X volts, respectively. Available at the collector electrode 203 is an output binary signal A, which is shown in FIG. 2 as being coupled to a utilization circuit 236.

The emitter electrode 202 of the transistor 200 is directly connected to the emitter or input electrode 212 of the transistor 210 and through a resistor 238 to a positive source 239 of W volts. The base electrode 211 of the transistor 210 is grounded.

The collector electrode 213 of the transistor 210 is connected through a resistor 240 to a negative source 241 of Z volts and, also, is connected to the cathode and anode, respectively, of diode elements 242 and 243, the respective anode and cathode of the elements 242 and 243 being connected to negative sources 244 and 245 of Y and X volts, respectively. Available at the collector electrode 213 is an output binary signal B, which is shown in FIG. 2 as being coupled to a utilization circuit 248.

Interconnecting the collector electrode 213 of the second transistor 210 and a node point 250, which is directly connected to the base electrode 201 of the first transistor 200, is a feedback network including $n-1$ parallel resistors. In the specific embodiment of FIG. 2 $n$ equals 3; thus $n-1$ equals 2. The two feedback resistors of the embodiment are designated 246 and 247.

The operation of the unanimity memory circuit shown in FIG. 2 is similar to that of the circuit of FIG. 1A and is also represented by FIGS. 1B and 1C.

From an overall standpoint, the two amplifying devices 200 and 210 of FIG. 2 may be regarded as comprising a difference amplifier. That is, the circuit of FIG. 2 provides at its output terminals 203 and 213 signals which represent the difference between the sum of the signals coupled to the input terminal 201 and the fixed voltage of the input terminal 211.

A specific illustrative set of circuit parameters for the two embodiments described herein follows:

| | |
|---|---|
| Transistors 100, 110, 200, 210 | Philco type 2N240. |
| Diodes 132, 133, 142, 143, 232, 233, 242, 243 | Transitron type S181G. |
| −Z sources 131, 141, 231, 241 | −25 volts. |
| +V sources 127, 227 | +6 volts. |
| +W sources 139, 239 | +6 volts. |
| −Y sources 134, 144, 234, 244 | −6 volts. |
| −X sources 135, 145, 235, 245 | −2 volts. |
| Resistors 120, 121, 122, 138, 146, 147, 220, 221, 222, 246, 247 | 1,000 ohms. |
| Resistors 130, 140 | 1,200 ohms. |
| Resistors 137 | 680 ohms. |
| Resistors 128, 228 | 300 ohms. |
| Resistors 230, 240 | 1,700 ohms. |
| Resistor 238 | 410 ohms. |

Advantageously, each of the bias supplies 127 and 227 of the circuits of FIGS. 1A and 2, respectively, may be selected to have the value $X+Y$, in which case each of the bias resistors 128 and 228 could have an ohmic value equal to that of $n$ resistors in parallel, each of the $n$ parallel resistors being of the value of one of the equivalued input and feedback resistors. The inclusion of an additional input path to such a circuit would then simply involve adding an additional parallel equivalued resistor to each of the input, feedback and bias networks thereof.

Thus, there have been described herein two simple and reliable embodiments of a unanimity memory circuit made in accordance with the principles of this invention. It is to be understood, however, that the above-described arrangements are only illustrative of the application of the principles of the invention. Numerous other arrangements may be devised by those skilled in the art without departing from the spirit and scope of the invention. For example, n-p-n transistors may be easily substituted for p-n-p transistors, if the polarities of the sources associated therewith are also changed, in a manner well known in the art. Furthermore, any known direct-current amplifying devices may be substituted for the above-specified transistors to form illustrative embodiments of this invention.

Also, although in the interest of simplicity and clarity of presentation of the invention, only three input resistors and two feedback resistors are shown in each of the specific circuits of FIGS. 1A and 2, it is to be emphasized that each of these circuits may include $n$ input resistors and $n-1$ feedback resistors. Additionally, it is to be understood that a circuit made in accordance with this invention may, of course, include only one feedback resistor (or a network of feedback resistors) whose equivalent ohmic value is equal to that of $n-1$ parallel feedback resistors.

Furthermore, the principles of the present invention the equally applicable to unanimity memory circuits in which the $n$ input and $n-1$ feedback resistors are replaced by passive or active linear elements, for example, capacitors, inductors or amplifiers.

What is claimed is:

1. In combination a binary logic circuit, first and second signal translating means each including input and output electrodes, circuit means connected to the input electrode of said second signal translating means and responsive to the energization and deenergization of said first signal translating means for respectively deenergizing and energizing said second means, output circuit means connected to the output electrode of one of said first and second signal translating means, feedback circuit means including $n-1$ parallel resistors interconnecting the output electrode of said second means and the input electrode of said first means, input circuit means including $n$ parallel resistors connected to the input electrode of said first means, and means including said feedback circuit means responsive to the respective application of $n$ identical signals to said $n$ resistors for coupling to said output circuit means a signal representative of one or the other binary value depending respectively on the binary value of the $n$ identical input signals and responsive to the application of nonidentical signals to said input circuit means for maintaining said output circuit means in the condition representative of the most recently applied set of identical input signals.

2. A combination as in claim 1 further including first diode means connected to the output electrode of said first signal translating means for clamping said output electrode at voltages respectively representative of the energization and deenergization of said first translating means, and second diode means connected to the output electrode of said second translating means for clamping said output electrode at voltages respectively representative of the energization and deenergization of said second translating means.

3. In combination in a binary logic circuit, first and second signal translating means each including input and output electrodes, circuit means interconnecting the output electrode of said first means and the input electrode of said second means, output circuit means connected to the output electrode of one of said first and second means, feedback circuit means including $n-1$ parallel resistors interconnecting the output electrode of said second means and the input electrode of said first means, input circuit means including $n$ parallel resistors connected to the input electrode of said first means, and means including said feedback circuit means responsive to the respective application of $n$ identical signals to said $n$ resistors for coupling to said output circuit means a signal representative of one or the other binary value depending respectively on the binary value of the $n$ identical input signals and responsive to the application of nonidentical signals to said input circuit means for maintaining said output circuit means in the condition representative of the most recently applied set of identical input signals.

4. In combination in a binary logic circuit, first and second signal translating means each including two input electrodes and an output electrode, circuit means interconnecting one of the input electrodes of said first means and one of the input electrodes of said second means, the other input electrode of said second means being grounded, output circuit means connected to the output electrode of one of said first and second means, feedback circuit means including $n-1$ parallel resistors interconnecting the output electrode of said second means and the other input electrode of said first means, input circuit means including $n$ parallel resistors connected to said other input electrode of said first means, and means including said feedback circuit means responsive to the respective application of $n$ identical signals to said $n$ resistors for coupling to said output circuit means a signal representative of one or the other binary value depending respectively on the binary value of the $n$ identical input signals and responsive to the application of non-identical signals to said input circuit means for maintaining said output circuit means in the condition representative of the most recently applied set of identical input signals.

References Cited in the file of this patent

UNITED STATES PATENTS

| | | |
|---|---|---|
| 2,603,746 | Burkhart | July 12, 1952 |
| 2,712,065 | Elbourn et al. | June 28, 1955 |
| 2,831,126 | Linvill et al. | Apr. 15, 1958 |